Nov. 19, 1935.   F. P. BINGMAN   2,021,281
AIR CLEANER FOR SPRAY BOOTHS
Original Filed Feb. 4, 1932   3 Sheets-Sheet 2
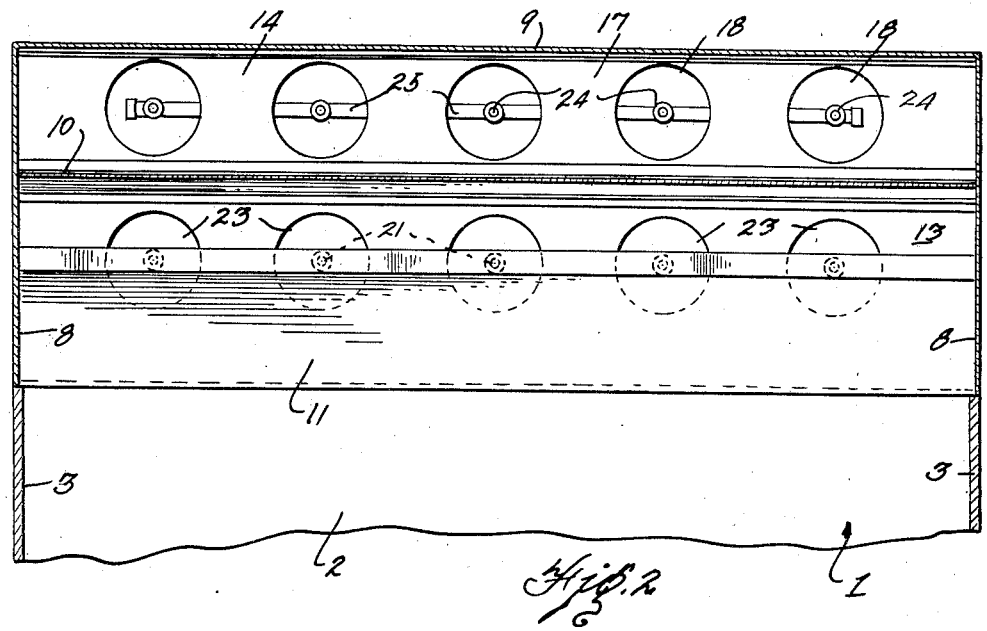
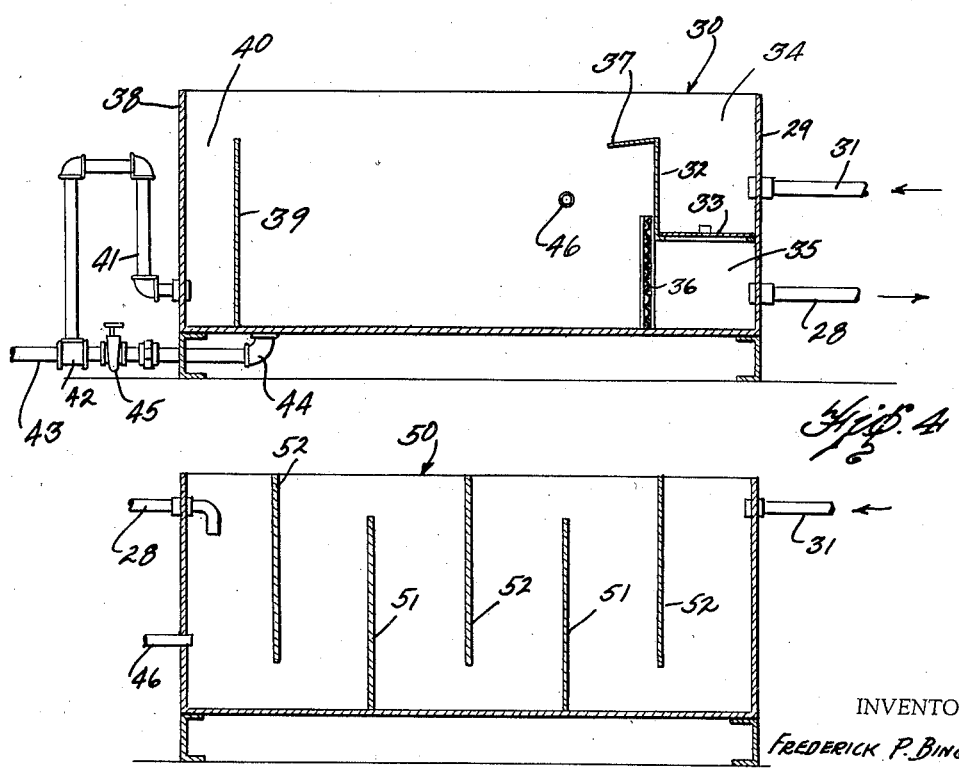
INVENTOR.
FREDERICK P. BINGMAN
BY
Charles E. Winner
ATTORNEY.

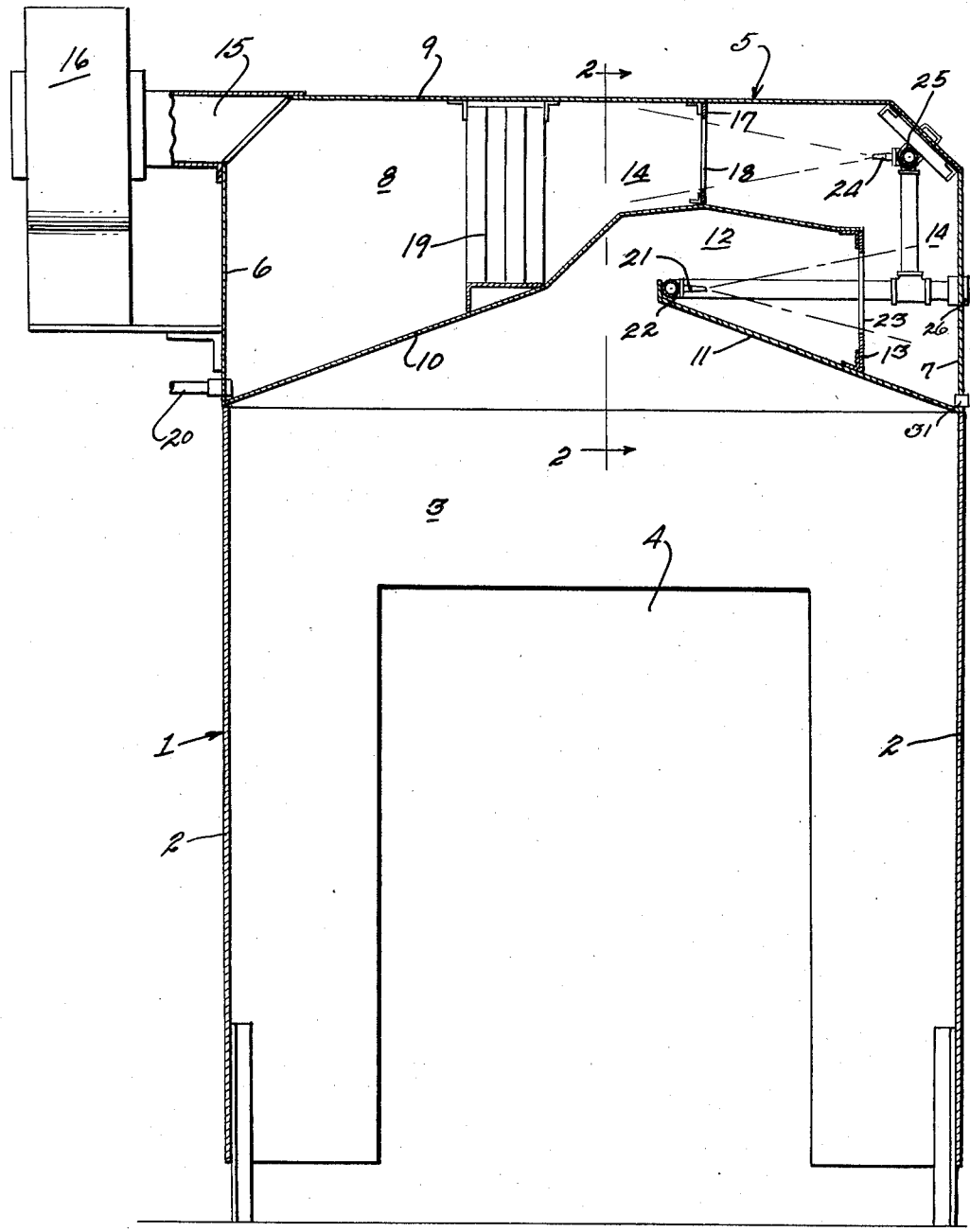

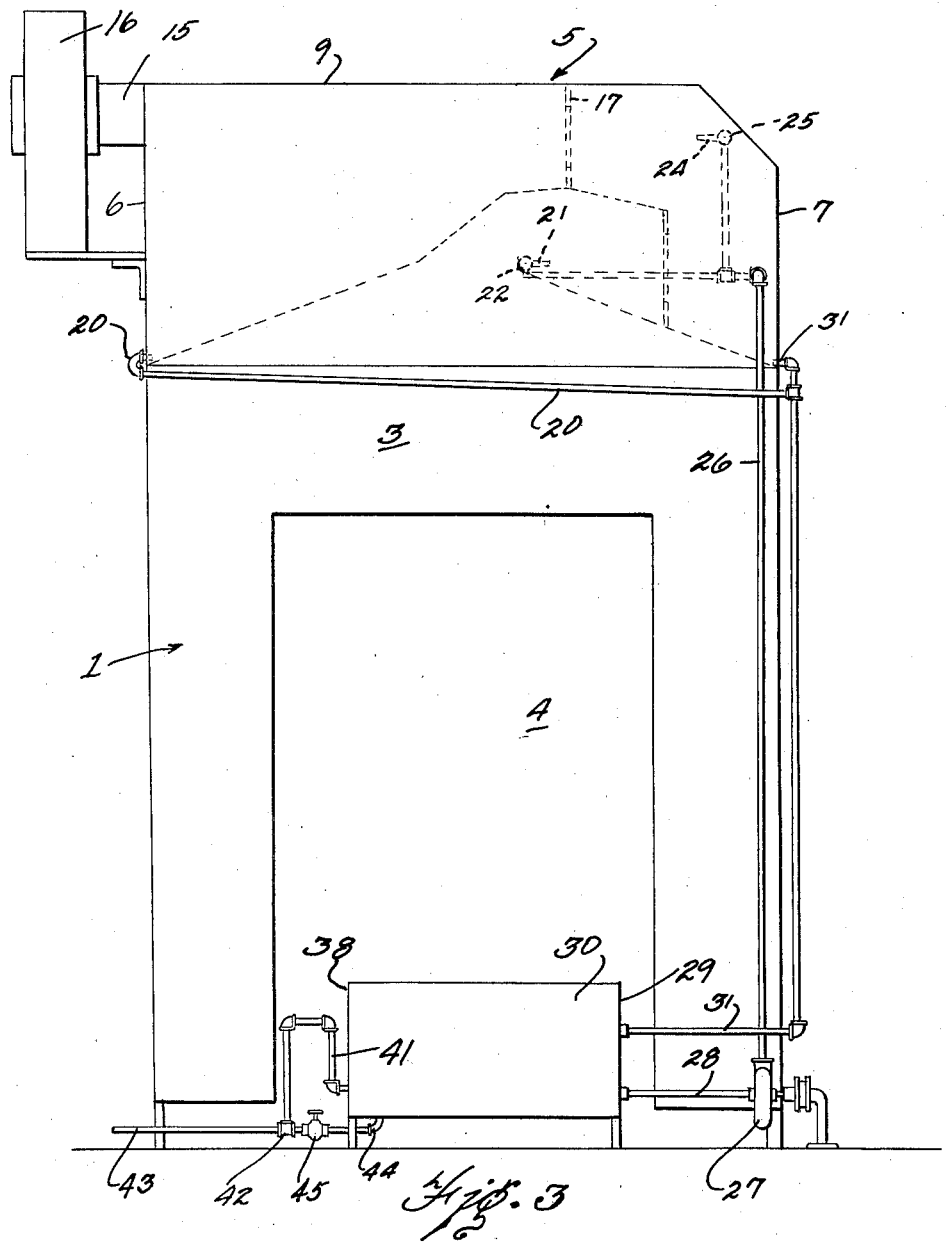

UNITED STATES PATENT OFFICE 2,021,281

AIR CLEANER FOR SPRAY BOOTHS

Frederick P. Bingman, Birmingham, Mich., assignor to The R. C. Mahon Company, Detroit, Mich., a corporation of Michigan Application February 4, 1932, Serial No. 590,863
Renewed August 27, 1934

5 Claims. (Cl. 183—26)

This invention relates to air cleaners for spray booths and the like wherein paint, lacquer and other forms of liquid for coating automobile bodies or other objects are sprayed thereonto, and an object of the invention is to provide, in conjunction with a spray booth, means for causing a continuous flow of clean air through the booth and to thoroughly wash the same by means of sprays in certain relationships whereby the air is thoroughly washed before discharging to atmosphere.

A further object of the invention resides in the provision of an air cleaning system in which means is provided for removing the floating paint particles from the air stream and to collect such particles in a body of liquid, as water for instance, from which the pigment may be recovered.

Another object of the invention is in the provision of an air cleaner system in which the air drawn from the spray booth is passed through a series of liquid spray nozzles and the liquid from the spray nozzles returned to a tank in which the foreign material is separated from the liquid to permit the liquid to be re-used thereby cutting down the cost of operation of the device.

Another object of the invention is in the provision of an air cleaner system for spray booths or the like that is arranged to draw air from the top of the booth along its entire length so that the air is drawn into the cleaner from all different points of the booth.

A further object and feature of the invention is in the provision of an air cleaner system for spray booths and the like so arranged as to draw the air through a wall of the booth at such point above the floor line that the occupants of the booth operate in clean air and the fumes and floating particles are taken from the booth by the air and subsequently separated therefrom.

A major feature of the invention resides in the provision of a conduit connected with a source of supply of material laden air and an exhaust fan at the discharge end of the conduit for causing a flow of air therethrough and in the formation of the conduit intermediate its length with an aperture of less area than the cross sectional area of the conduit on either side of the aperture and the directing of a liquid spray through the aperture whereby the material laden air enters the inlet end of the conduit at comparatively low speed and passes at high speed through the aperture and the spray into a second area of low speed whereby material laden air in passing from the first to the second low speed area enters the liquid spray at comparatively high speed and the spray and foreign particles taken up thereby are projected at comparatively high speed into the second area of low speed air movement.

A further feature resides in the provision of a chamber in which the sprayed fluid accumulates and from which liquid is taken preferably midway of the body and discharged through the nozzles. By taking the liquid from a center plane of the body of liquid in the chamber, the cleaner liquid is continuously used and floating particles on the surface and particles depositing by gravity in the bottom of the chamber are practically undisturbed.

These objects and the several novel features of the invention are hereinafter more fully described and claimed and the preferred form of construction by which these objects are attained is shown in the accompanying drawings in which—

Fig. 1 is a vertical sectional view through a spray booth equipped with my improved air cleaner.

Fig. 2 is a section taken on line 2—2 of Fig. 1.

Fig. 3 is an elevational view more or less diagrammatic showing the complete system.

Fig. 4 is a longitudinal sectional view through the water tank.

Fig. 5 is a similar view showing a modified form of tank.

Referring to the drawings, the spray booth or tunnel 1 may be of any desired construction but is here shown as comprising the side walls 2 and the end walls 3. The end walls 3 are each provided with an opening 4 for permitting an automobile body or the like (not shown) to be moved into the booth. The side walls 2 are preferably stopped short of the floor to permit fresh air to be drawn into the booth. The position of the fresh air opening may be varied however as circumstances may require. It will be understood, of course, that various types of booths may be used as no claim is made to this portion of the device apart from its application to the air cleaner. The air cleaner unit 5 is positioned above the top of the spray booth 1 and comprises the side walls 6 and 7, the end walls 8 and the top wall 9.

The lower wall 10 preferably slopes upwardly toward the center from the juncture of the upper edge of the side wall 2 of the spray booth and the lower edge of the wall 6 and terminates at the upper edge of the plate 13 and the wall 11 slopes upwardly from the junction of the upper edge of the opposite side wall 2 of the booth and the lower edge of the wall 7 of the air cleaner 5 and by referring to Fig. 1, it will be seen that a conduit 12 is formed by the walls 10 and 11 which terminates at the plate 13. The conduit 12 may, if desired, open directly into the booth. A second conduit 14 is formed by the walls 9 and 10 and the wall 7 and the plate 13 and terminates in the outlet 15 connected to the suction fan 16. The conduits 12 and 14 thus form a U-shaped discharge conduit. A plate 17 having the apertures 18 therein is positioned in the conduit 14 and the baffles or eliminators 19 are likewise positioned in the conduit 14 so that any foreign material in the air will pass down over the upper surface of the wall 10 to the drain pipe 20. A plurality of spray nozzles 21 are connected to the pipe 22 one nozzle being axially arranged in respect to each aperture 23 formed in the plate 13. In like manner a plurality of liquid spray nozzles 24 are connected to the pipe 25 and one nozzle is axially arranged in respect to each aperture 18 in the plate 17. The nozzles 21 and 24 are supplied with liquid from the pipe 26, the same being connected to the liquid pump 27 receiving liquid from the pipe 28 connected to the end 29 of the tank 30. A drain pipe 31 opens through the wall 7 of the air cleaner to drain liquid from the nozzles 21 back to the tank. The pump 27 will maintain a uniform pressure on the nozzles 21 and 24 so that the area of the sprays will be constant as they pass through the apertures in the respective plates 13 and 17.

The nozzles form a cone shaped spray and are so positioned in respect to the apertured plates that the diameter of the spray is approximately equal to the diameter of the aperture through which it is projected and thus the air stream laden with the foreign material is required to pass into the spray to pass through the aperture.

Due to the two conduits 12 and 14 forming substantially a U-shaped conduit, the spray from the nozzles 21 is directed against the wall 7 formed by the base of the U bend and thus provides a wall washed with the spray and against which the particles taken by the air stream are projected and washed down to the discharge pipe and further the air is drawn laterally from this spray into the spray from the nozzles 24. The momentum of the particles of foreign matter taken up by the spray is such that they strike the wall and do not follow the direction of the flow of the air stream and thereafter the air stream thus clarified is preferably passed into a second spray in order to pass through the apertures of the plates 17. Thus any remaining particles are taken up by the spray and the air then passes through the eliminators wherein moisture carried by the air is caused to be deposited and washing any particles carried thereby onto the upper side of the wall 10 and thence to an outlet pipe 20 leading to the tank 30.

The pipe 20 connects to the pipe 31 and the lower end of the pipe 31 opens into the tank 30 at a point above the pipe 28. A baffle 32 extends between the sides of the tank 30 and the upper edge is above the entrance of the pipe 31 into the tank while the lower edge is stopped short of the bottom at a point above the entrance of the pipe 28 to the tank. A plate 33 separates the chamber 34 to which the pipe 31 enters from the chamber 35 to which the pipe 28 is connected and a screen 36 extends between the sides of the tank 30 and from the bottom thereof to the lower edge of the baffle 32. A plate 37 extends from the upper edge of the baffle 32 and slopes downwardly toward the end wall 38. A plate 39 is positioned adjacent the end 38 and extends between the side walls of the tank and the upper edge of the same is slightly lower in height than the upper edge of the baffle 32 and forms a chamber 40 to which one end of the pipe 41 is connected extending through the end wall 38, the opposite end of the pipe being connected by a T 42 to the line 43 opening to the sewer. The end 44 of the line 43 connects to the bottom of the tank 30 and by opening the valve 45 the tank may be drained when desired. It will be understood, of course, that the valve 45 is normally closed during operation of the device. A liquid inlet pipe 46 opens to the tank 30 and supplies continuously a small amount of water to the tank.

The operation of the device is as follows: Air from the spray booth 1 will be drawn through the conduit 12 by means of the suction fan 16 and will pass through the spray of liquid from the nozzles 21, will then pass through the openings 23 through the openings 18 where it will again be washed by the liquid spray from the nozzles 24, will then pass through the baffles or eliminators 19 to the fan 16 where it may be discharged to atmosphere or again used to supply fresh air to the spray booth. The liquid from the nozzles 21 and 24 will drain back through the pipe 31 to the tank 30. It will be understood, of course, that the tank 30 will first be filled with liquid to the height equal to the height of the plate 39. The liquid draining into the chamber 34 will pass over the upper edge of the baffle 32 down over the plate 37 which will permit a smooth easy flow of the liquid so as not to agitate the liquid in the tank to too great a degree. Inasmuch as liquid is being admitted to the pipe 46 the upper surface of the liquid containing the foreign material will be skimmed off by the upper edge of the plate 39 and the foreign material will be retained in the chamber 40 as the outlet pipe 41 connects adjacent the lower edge of the chamber 40. The liquid that is practically free from foreign material will pass through the screen 36 into the chamber 35 and will then be drawn through the pipe 28 by the pump 27 and then be re-circulated through the pipe 26 to the nozzles 21 and 24.

It has been found that when using paints with certain properties that the pigment of the paint did not precipitate but floated on the top of the liquid so that as the liquid from the cleaner was passed into the tank 30 the pigment of the paint would practically float on the surface of the water and would be skimmed off by the upper edge of the plate 39. When sufficient pigment has been gathered in the chamber 40 the device will be shut off and the pigment removed from the chamber. The same may then be dried and reground and again used when properly mixed with certain other constituents commonly known and used.

Referring now to Fig. 5, I have shown a modified form of tank which may be used when the specific gravity of the foreign material is greater than that of the liquid used so that as the liquid and foreign material are brought to the tank the foreign material will precipitate to the bottom of the tank. In this form of structure the tank 50 is provided with a series of baffles or weirs 51 extending from side to side of the tank and stopping short of the upper edge thereof and approximately on the same level as the return pipe 31 from the air cleaner. The tank is further provided with a plurality of baffles 52 extending from side to side of the tank and stopping short of the bottom and the pipe 28 leading to the pump 27 is positioned at the opposite end of the tank to that in which the conduit 31 enters so that the liquid will be delayed in its movement through the tank to permit the foreign material in the liquid to precipitate to the bottom of the tank. The pipe 46 enters the tank at any desired point and supplies a small continuous stream of liquid to the tank to compensate for evaporation of the liquid in the cleaner.

In recapitulation, it will be observed that the device is comparatively simple in construction and arrangement in that the air is thoroughly cleansed of floating particles of matter and although the device is described as being essentially a spray booth, the invention is not confined to removing paint particles as air can be cleansed of any foreign material carried thereby by the apparatus described, and an essential characteristic of which is the arrangement wherein the material laden air stream is caused to enter a spray of liquid whereby the foreign matter requires the momentum of the spray, the discharging of said spray and foreign material against a surface which, being wet by the spray, prevents the foreign material from adhering thereto due to the foreign material being projected into the film of liquid thereon and that due to the momentum of the foreign material it does not follow the direction of the flow of air in passing out of the spray. Thus the air is freed therefrom and a second spray may be utilized to remove any additional possible floating particles not taken up by the first spray.

A further feature of the invention resides in the provision of a chamber in which the sprayed liquid accumulates and from which the nozzles are supplied with liquid, the liquid being taken therefrom at a point above the bottom surface and below the liquid level. This arrangement is provided in order that particles of matter floating on the surface of the liquid or deposited by gravity in the bottom of the chamber are not materially disturbed.

It will be observed from the foregoing that my improved air cleaning device is comparatively simple in construction and arrangement and that the air is thoroughly cleansed of floating particles of matter and, although the device is described as being essentially a spray booth, a conduit may be employed with other structures wherein material laden air may be taken therethrough to be cleansed. The essential characteristic of construction of the conduit is in the provision of an aperture or orifice intermediate its ends of less area than the cross sectional area of the conduit on either side and the projection of a liquid spray longitudinally of the conduit through the aperture. By this arrangement in conjunction with an exhaust fan at the discharge end of the conduit, a Venturi like action is secured in that the air speed is materially increased in passing into the spray whereby the spray and particles of foreign material taken from the air stream are projected and by momentum are carried against a surface which is wet by the spray and the spray and material fall by gravity in the preferred construction shown and then removed from the conduit to a chamber in which it accumulates. Thus the air is comparatively slow moving at the inlet end of the conduit and due to the Venturi like action is at high speed at the point of constriction and again is at slow speed after passing said point. As the air stream is comparatively slow moving after passing through the aperture and contained particles are at high speed the air may pass out of the spray freed of the particles of material taken up by the spray.

It is further believed evident that the various objects of the invention are attained by the construction and arrangement of the parts described.

Having thus fully described my invention, its utility and mode of operation, what I claim and desire to secure by Letters Patent of the United States is—

1. In an air cleaning system for a paint spray booth in which the air is charged with foreign material, a casing having a wall providing one wall of the spray booth formed with outwardly and oppositely inclined portions spaced at approximately the center to provide an aperture transversely of the booth, a pair of conduits in the casing one taking its inlet from the said aperture and discharging to the inlet end of the other, an exhaust fan at the outlet end of the second conduit, a liquid spray means in both the said conduits through which the air is caused to pass in passing to the outlet of the second conduit to thereby eliminate a part of the foreign material carried by the air stream, means in the second conduit between the outlet end and the spray means of the second conduit to eliminate any foreign material carried by the air stream, means for withdrawing the liquid from the casing, a receiver for the withdrawn liquid, and means in the receiver providing for a separation of foreign material from the sprayed liquid.

2. In an air cleaning system for a paint spray booth, one wall thereof having an opening through which air entering the booth passes, a discharge conduit having a U bend therein, one end of which is connected to the said opening, an exhaust fan connecting with the other end of the conduit, a liquid spray adjacent the said inlet and discharging in the direction of flow of air therein, and a plate having an aperture through which the spray is projected, the arrangement being such that the air to pass through the aperture is required to pass into the spray, the outer wall of the U bend providing a surface against which the spray from said nozzle is projected whereby the foreign material taken up by the spray is discharged against a film of liquid on the said surface, the U shape of the conduit causing the air to pass laterally out of the spray to the exhaust fan, means for withdrawing the liquid sprayed into the discharge conduit, means for separating the foreign material from the withdrawn liquid, and means for returning the clarified liquid to the spray devices.

3. In an air cleaning system for paint spray booths, one of the walls of the booth having an air inlet opening and another having an outlet opening, a discharge conduit having one end connected to the outlet, an exhaust fan connected to the opposite end of the conduit, a liquid spray device in the conduit whereby foreign matter carried in suspension in the air stream is precipitated with the liquid, a receiver in which the sprayed liquid and material are accumulated, means in the receiver for separating the foreign material from the liquid, and means for discharging the clarified liquid to the spray device.

4. In an air cleaning system for paint spray booths into which air may pass, one of the walls of the booth having an outlet for air, a conduit having its inlet end connected with the said outlet, said conduit having a sharp bend, a liquid spray device discharging into the conduit and against a wall of the bend, the spray taking up the foreign material and discharging the same with the liquid against the said wall of the conduit, means for withdrawing the liquid from the conduit, means for separating the foreign matter from the liquid, and means for supplying the spray device with the clarified liquid.

5. In an air cleaning system for paint spray booths into which air may flow and having an outlet for air, a discharge conduit connected with the air outlet, an exhaust fan for causing a flow of air from the booth through the discharge conduit, a spray device in the conduit, a receiver to which the sprayed liquid is delivered, the liquid sprayed through the spray device picking up the foreign material in the air stream, said receiver being constructed to provide for separation of the liquid and foreign material, means for withdrawing the foreign material from the receiver, and means for discharging the clarified liquid to the spray device.

FREDERICK P. BINGMAN.